(12) United States Patent
Qi et al.

(10) Patent No.: US 8,700,891 B2
(45) Date of Patent: Apr. 15, 2014

(54) PRESERVING SECURITY ASSOCIATION IN MACSEC PROTECTED NETWORK THROUGH VLAN MAPPING

(75) Inventors: Zheng Qi, San Jose, CA (US); Meg Lin, Saratoga, CA (US); Mark Buer, Gilbert, AZ (US); Nicholas Ilyadis, Merrimack, NH (US)

(73) Assignee: Broadcom Corporation, Irvine, CA (US)

( * ) Notice: Subject to any disclaimer, the term of this patent is extended or adjusted under 35 U.S.C. 154(b) by 971 days.

(21) Appl. No.: 12/463,204

(22) Filed: May 8, 2009

(65) Prior Publication Data

US 2009/0307751 A1 Dec. 10, 2009

Related U.S. Application Data

(60) Provisional application No. 61/051,921, filed on May 9, 2008.

(51) Int. Cl.
*G06F 9/00* (2006.01)
*G06F 15/16* (2006.01)
*G06F 17/00* (2006.01)
*H04L 29/06* (2006.01)

(52) U.S. Cl.
USPC ........... 713/153; 713/150; 709/230; 709/236; 709/238; 709/245; 726/2; 726/11; 726/15

(58) Field of Classification Search
USPC .......... 713/171, 150, 153, 154; 709/230, 236, 709/238, 242, 245; 726/2, 3, 11, 14, 15
See application file for complete search history.

(56) References Cited

U.S. PATENT DOCUMENTS

| | | | | |
|---|---|---|---|---|
| 7,724,899 | B2* | 5/2010 | Han et al. | 380/46 |
| 8,000,344 | B1* | 8/2011 | Frick | 370/466 |
| 2004/0017816 | A1* | 1/2004 | Ishwar et al. | 370/395.53 |
| 2004/0252722 | A1* | 12/2004 | Wybenga et al. | 370/474 |
| 2005/0058132 | A1* | 3/2005 | Okano et al. | 370/389 |
| 2006/0112431 | A1* | 5/2006 | Finn et al. | 726/22 |
| 2006/0227773 | A1* | 10/2006 | Grewal et al. | 370/389 |
| 2007/0133791 | A1* | 6/2007 | Han et al. | 380/46 |
| 2008/0002724 | A1* | 1/2008 | Grewal et al. | 370/401 |
| 2008/0075073 | A1* | 3/2008 | Swartz | 370/389 |
| 2008/0123652 | A1* | 5/2008 | Akyol | 370/392 |
| 2008/0126559 | A1* | 5/2008 | Elzur et al. | 709/232 |
| 2009/0217032 | A1* | 8/2009 | Guan | 713/154 |
| 2009/0276830 | A1* | 11/2009 | O'Connor | 726/3 |

OTHER PUBLICATIONS

"IEEE 802.1AE", From Wikipedia.org (Retrieved on Apr. 14, 2009) Available at http://en.wikipedia.org/wii/MACsec.

(Continued)

*Primary Examiner* — Tae Kim
(74) *Attorney, Agent, or Firm* — McDermott Will & Emery LLP

(57) ABSTRACT

According to one general aspect, a method of using a network device may include receiving, via an ingress port, a data packet that includes a payload portion, a source network address and a destination network address. In various embodiments, the method may also include determining if the data packet includes a security tag that includes a role based authentication tag. In some embodiments, the method may include, if the data packet includes a security tag that includes a role based authentication tag, transmitting, via an egress port, at least the payload portion and the role based authentication tag towards, in a topological sense, the destination network address.

20 Claims, 5 Drawing Sheets

(56) References Cited

OTHER PUBLICATIONS

"IEEE Standard for Local and Metropolitan Area Networks", IEEE Std 802.IQ TM-2005, Virtual Bridged Local Area Networks, IEEE Computer Society-,(May 19, 2006),303 pages.

"IEEE 802.1Q", From Wikipedia.org, Web Page (Retrieved on Apr. 12, 2009) Available at http://en.wikipedia.org./wiki/IEEE_802.1Q.

"802.1X IEEE Standard for Local and Metorpolitan Area Networks", IEEE Std 802.1X-2004 (Revision of IEEE Std. 802. 1x-2001), Port-Based Network Access Control, IEEE Computer Society,179 pages.

"IEEE Standard for Local and Metropolitan Area Networks", IEEE Std 802.1 AE-2006, Media Access Control (MAC) Security, IEEE Computer Society,(Aug. 18, 2006) 154 Pages.

* cited by examiner

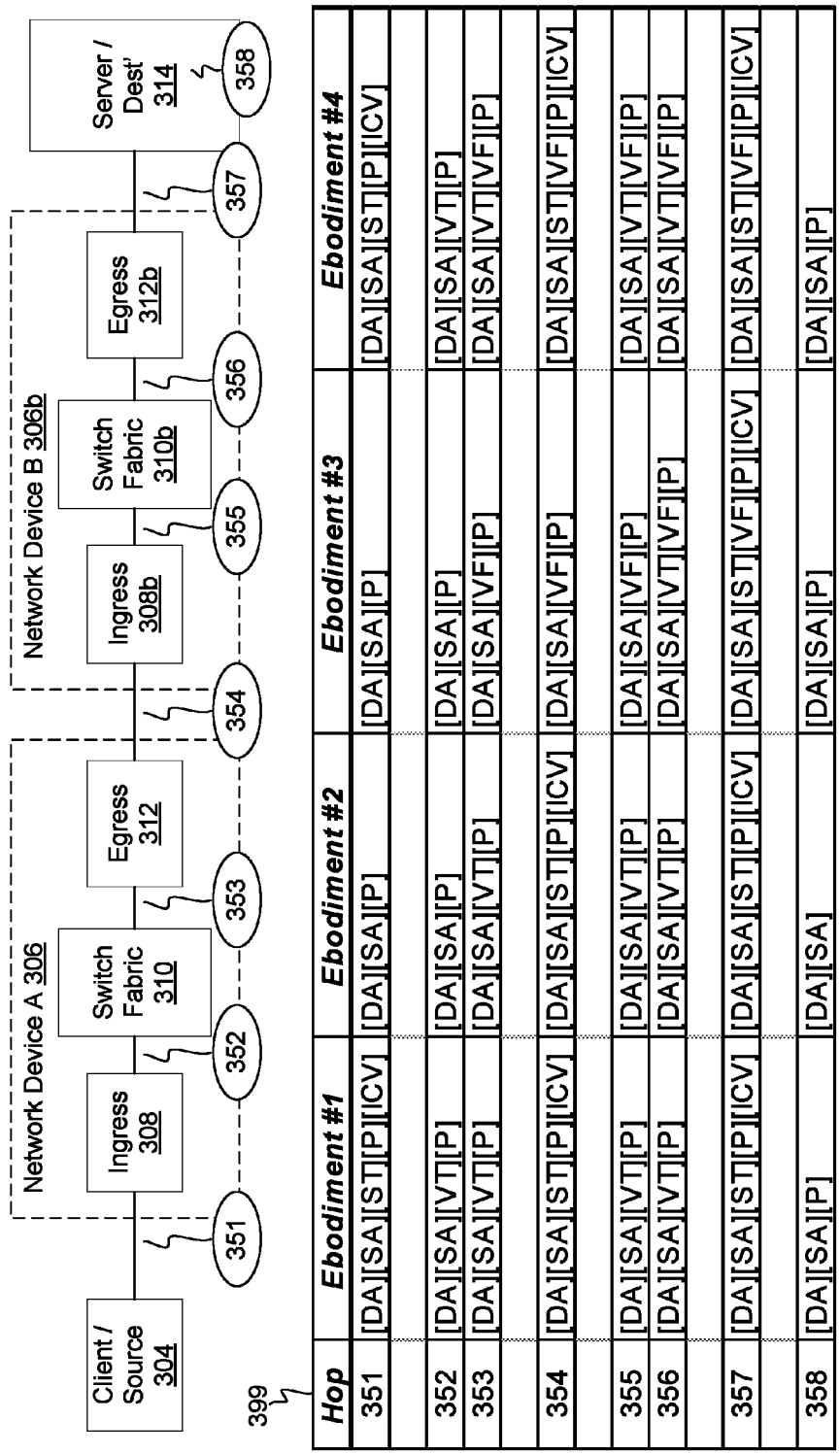

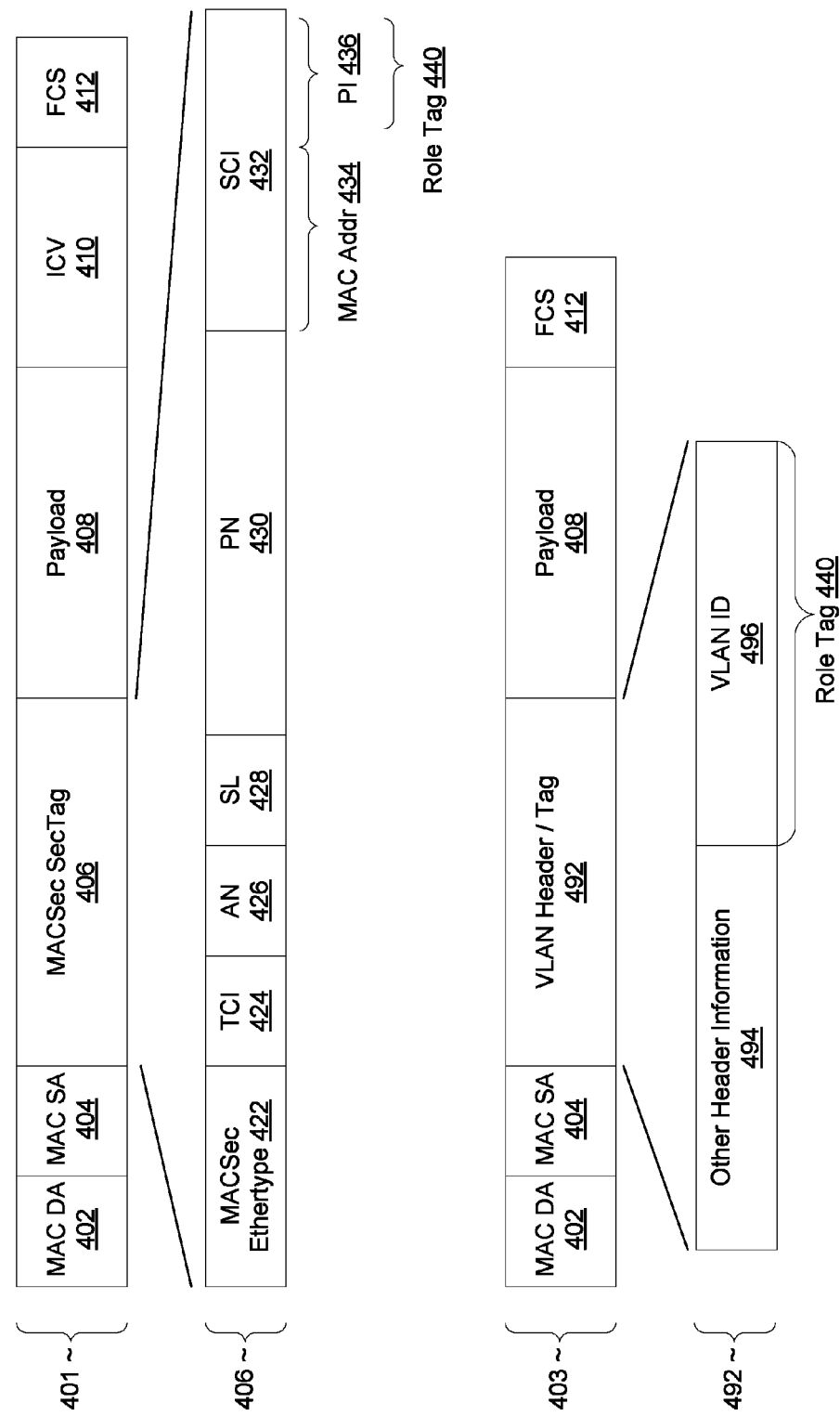

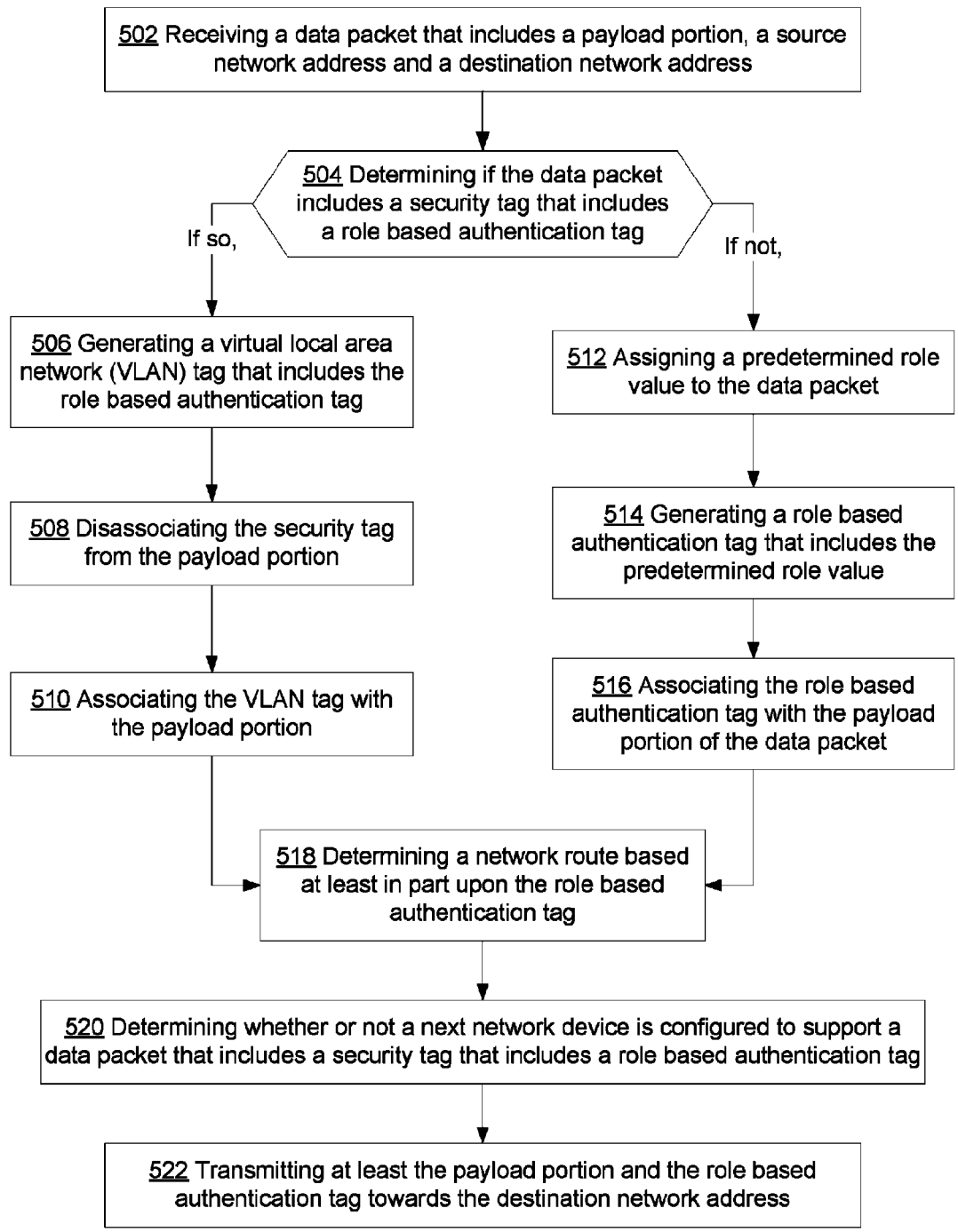

PRESERVING SECURITY ASSOCIATION IN MACSEC PROTECTED NETWORK THROUGH VLAN MAPPING

CROSS-REFERENCE TO RELATED APPLICATION

This application claims priority under 35 U.S.C. §119 to U.S. Provisional Patent Application 61/051,921, filed May 9, 2008, titled "PRESERVING SECURITY ASSOCIATION IN MACSEC PROTECTED NETWORK THROUGH VLAN MAPPING," which is incorporated herein by reference in its entirety.

TECHNICAL FIELD

This description relates to the communication of information via a network, and more specifically to preserving role based security association in a protected network.

BACKGROUND

It is know that computer networks are extremely vulnerable to configuration mistakes, mis-wiring and malicious attacks that can interrupt organization and service provider operations. Therefore, it is generally crucial for any enterprises to apply various security mechanisms to protect their data, applications and networks functions.

The I.E.E.E. (Institute of Electrical and Electronics Engineers) 802.1 AE (MACsec) standard specifies a set of protocols to meet the security requirements for protecting data traversing local area networks (LANs). MACsec allows unauthorized LAN connections to be identified and excluded from communication within the network. In common with Internet Protocol Security (IPsec) and Secure Sockets Layer (SSL), MACsec defines a security infrastructure to provide data confidentiality, data integrity and data origin authentication. By assuring that a frame or packet comes from the network device that claimed to send it, MACsec can mitigate attacks on the networking Layer 2 protocols. A MACsec enabled network often includes a network that is substantially in compliance with the MACsec standard, their derivatives, or predecessors (hereafter, "the MACsec standard" or "802.1 AE standard"). IEEE Computer Society, *IEEE Standard for Local and metropolitan area networks, Media Access Control (MAC) Security*), IEEE Std. 802.1 AE™-2006 (18 Aug. 2006).

A virtual LAN (VLAN) is often a group of hosts or network devices that communicate as if they were attached to the same broadcast domain, regardless of their physical location. A VLAN frequently has the same high-level attributes as a physical LAN, but it allows for end stations or network devices to be grouped together even if they are not located on the same network switch. Furthermore, often network reconfiguration can be done through software instead of physically relocating devices. VLANs are frequently useful if one wants to create multiple Layer 3 networks on the same Layer 2 switch. A VLAN enabled network often includes a network that is substantially in compliance with the VLAN standard, their derivatives, or predecessors (hereafter, "the VLAN standard" or "802.1Q standard"). IEEE Computer Society, *IEEE Standard for Local and metropolitan area networks, Virtual Bridged Local Area Networks*, IEEE Std. 802.1Q™-2005 (19 May 2006).

SUMMARY

According to one general aspect, a method of using a network device may include receiving, via an ingress port, a data packet that includes a payload portion, a source network address and a destination network address. In various embodiments, the method may also include determining if the data packet includes a security tag that includes a role based authentication tag. In some embodiments, the method may include, if the data packet includes a security tag that includes a role based authentication tag, transmitting, via an egress port, at least the payload portion and the role based authentication tag towards, in a topological sense, the destination network address.

According to another general aspect, an apparatus may include an ingress port, a processor, and an egress port. In one embodiment, the ingress port may be configured to receive a data packet that includes a payload portion, a source network address and a destination network address. In some embodiments, the processor may be configured to determine if the data packet includes a security tag that includes a role based authentication tag. In various embodiments, the egress port may be configured to, if the data packet includes a security tag that includes a role based authentication tag, transmit at least the payload portion and the role based authentication tag towards, in a topological sense, the destination network address.

According to another general aspect, a computer program product for communicating information, the computer program product being tangibly embodied on a computer-readable medium and including executable code that, when executed, is configured to cause a network apparatus to receive, via an ingress port, a data packet that includes a payload portion, a source network address and a destination network address. In various embodiments, the executable code may cause the network apparatus to determine if the data packet includes a security tag that includes a role based authentication tag. In various embodiments, the executable code may cause the network apparatus to, if the data packet includes a security tag that includes a role based authentication tag, transmit, via an egress port, at least the payload portion and the role based authentication tag towards, in a topological sense, the destination network address.

The details of one or more implementations are set forth in the accompanying drawings and the description below. Other features will be apparent from the description and drawings, and from the claims.

A system and/or method for communicating information, substantially as shown in and/or described in connection with at least one of the figures, as set forth more completely in the claims.

BRIEF DESCRIPTION OF THE DRAWINGS

FIG. 3 is a block diagram of an example embodiment of a system in accordance with the disclosed subject matter.

FIG. 4 is a block diagram of example embodiments of data packets in accordance with the disclosed subject matter.

FIG. 5 is a flow chart of an example embodiment of a technique in accordance with the disclosed subject matter.

DETAILED DESCRIPTION

Figure 1:
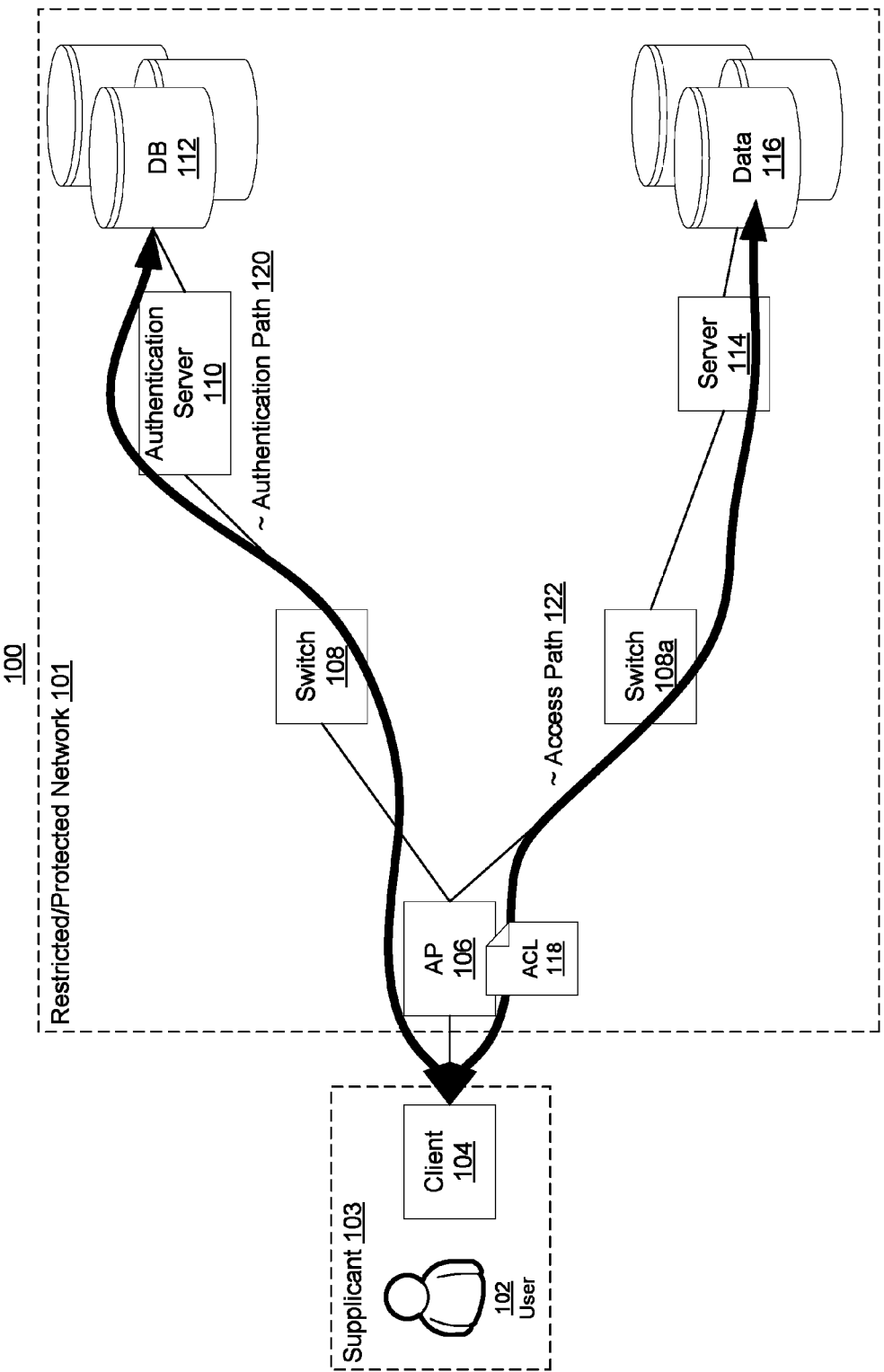
FIG. 1 is a block diagram of an example embodiment of a known system that may be used in accordance with the disclosed subject matter.

FIG. 1 is a block diagram of an example embodiment of a known system 100 that may be used accordance with the disclosed subject matter. In one embodiment, a user 102 or client device 104 (herein "supplicant", e.g. supplicant 103) may attempt to access a protected or restricted network 101 that restricts access to the network 101 and/or the resources provided by the network. In various embodiments, the protected or restricted network 101 may include an access point 106, a one or more switches or routing network devices (e.g., switches 108 or 108a), an authentication server or entity 110, and at least one server 114. In various embodiments, the authentication server or entity 110 may utilize a database 112 to authenticate the supplicant 103. In some embodiments, the server 114 may provide access to information or data 116.

In one embodiment, the supplicant 103 may desire access to the network 101. In such an embodiment, the supplicant 103 may interact with the perimeter (in a topological sense) of the network 101 via the access point (AP) 106. In various embodiments, the AP 106 may include a wired or wireless AP. In various embodiments, the AP 106 may ignore or drop any communications traffic from the supplicant 103 except authentication traffic.

In various embodiments, the AP 106 may forward any authentication traffic, authentication path 120, to the Authentication server 110. In some embodiments, such a path may include a number of network links (e.g., the link between the AP 106 and switch 108, or the link between the switch 108 and the authentication server 110, etc.).

In various embodiments, the authentication server 110 may employ or use one or more network authentication protocols, such as, for example Remote Authentication Dial In User Service (RADIUS), Diameter, or Terminal Access Controller Access-Control System Plus (TACACS+); although, it is understood that the above are merely a few illustrative examples to which the disclosed subject matter is not limited. In various embodiments, the authentication server 110 may employ various database 112 schemes to authenticate the supplicant 103. One such scheme may include Lightweight Directory Access Protocol (LDAP); although, it is understood that the above is merely one illustrative example to which the disclosed subject matter is not limited.

In one embodiment, the authentication server 110 may report back to the AP 106 or supplicant 103 with the results of the authentication attempt. Assuming the supplicant 103 has been properly authenticated and given the right to access the network 101, the AP 106 may then note the level of access rights given to the supplicant 103. In various embodiments, this may be done by associating the network address (e.g., Internet Protocol (IP) address) of the supplicant 103 with a rights scheme or level. However, this may be problematic in many environments as supplicants (e.g., laptops, smart phones, etc.) become more mobile and are likely to change their IP addresses while still desiring access to the network 101.

In some embodiments, the supplicant 103 may then wish to access the network 101 or data (e.g., data 116) thereon. In such an embodiment, the supplicant 103 may perform a user data communication requesting data 116, for example. In such an embodiment, the AP 106 may determine if the supplicant 103 has the proper access privileges or rights to access the data 116. In some embodiments, the AP 106 may make this determination based upon an Access Control List (ACL) 118 stored by the AP 106. If the supplicant 103 may access the data 116, the AP 106 may provide access via access path 122 that includes switch or routing network device 108a, server 114, and data 116.

Typically, the gating of supplicant 103 access to specific resources (e.g., data 116) is done at the perimeter of the network 101 (e.g., AP 106). As a result, any change in access privileges need to be pushed from the core of the network (e.g., server 114, authentication server 110, etc.) to the perimeter (e.g., AP 106). In instances where there are many APs (not shown) and/or the APs are widely distributed geographically updates to the ACLs may occur at different rates, such that, the ACLs across the network 101 perimeter are no longer synchronized.

Figure 2:
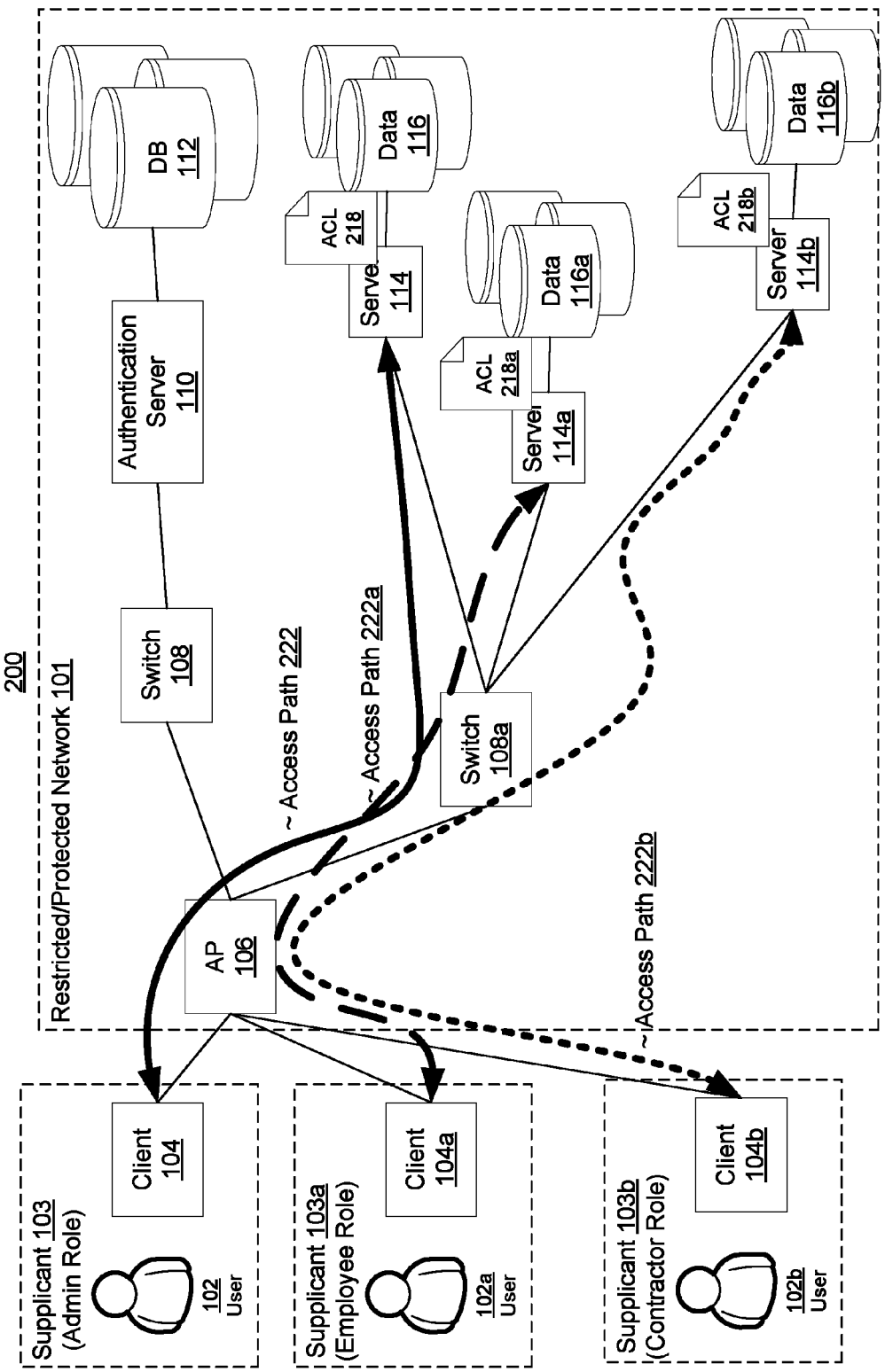
FIG. 2 is a block diagram of an example embodiment of a system in accordance with the disclosed subject matter.

FIG. 2 is a block diagram of an example embodiment of a system 200 in accordance with the disclosed subject matter. In various embodiments, the system 200 may include a plurality of supplicants (e.g., supplicants 103, 103a, and 103b), and a protected or restricted network 101. In one embodiment, the network 101 may include an access point (AP) 106, one or more routing network devices (e.g., switches 108 and 108a), and a plurality of servers (e.g., servers 114, 114a, and 114b). In various embodiments, the network 101 may also include an authentication server 110, a database 112, and various data (e.g., data 116, 116a, 116b).

As described above, a supplicant 103 may desire access to the network 101. In one embodiment, instead of having that access associated with the supplicant's network address, the authentication server 110 may assign a role to the supplicant (e.g., administrator, employee, contractor, etc.). In such an embodiment, this role may be encoded into or associated with the user data messages or communication sent by the supplicant.

For example, in one embodiment, the supplicant 103 may be assigned an "admin" role. In such an embodiment, when the supplicant 103 attempts to access data 116 (via access path 222), the supplicant's specific privileges may not be checked at the network periphery (e.g., AP 106), but instead at the network device (e.g., server 114) that controls the data. In such an embodiment, the server 114 may maintain its own ACL 216 that bases access rights on the supplicant's 103 assigned role and not the supplicant's 103 network address. In the illustrated embodiment, the ACL 218 may be configured to allow access to the data 116a by any supplicant bearing the "admin" role.

In another embodiment, the supplicant 103a (including user 102a and/or client 104a) may be assigned an "employee" role by the authentication server 110. In such an embodiment, the supplicant 103a may attempt to access data 116a via access path 222a. In various embodiments, supplicant 103a's access to the data 116a may be gated by the server 114a and the ACL 218a maintained or stored by the server 114a. In the illustrated embodiment, the ACL 218a may be configured to allow access to the data 116a by any supplicant bearing the "employee" or "admin" roles. Likewise, in various embodiments, the supplicant 103a may attempt to access data 116. In the illustrated embodiment, data 116 may be administrator level data, for example. The server 114 may determine (e.g., via ACL 218) whether or not supplicant 103a is authorized or assigned a role corresponding with the access privileges detailed in the ACL 218. In this embodiment, the supplicant 103a has been assigned the wrong role (e.g., the "employee" role) and, therefore, supplicant 103a's access may be blocked by the server 114.

In yet another embodiment, the supplicant 103b (including user 102b and/or client 104b) may be assigned a "contractor" role by the authentication server 110. In such an embodiment, the supplicant 103b may attempt to access data 116b via access path 222b. In various embodiments, supplicant 103b's access to the data 116b may be gated by the server 114b and the ACL 218b maintained or stored by the server 114b. In the illustrated embodiment, the ACL 218a may be configured to allow access to the data 116a by any supplicant bearing the "contractor", "employee", or "admin" roles. Conversely, supplicant 103b bearing or being assigned only the "contractor" role may be unable to access data 116 or 116a.

It is understood that the above roles and embodiments are merely a few illustrative examples to which the disclosed subject matter is not limited. It is also understood that in various embodiments the AP 106 may still perform a high-level access rights check to confirm that a supplicant is allowed on the network 101 at all, for example.

In various embodiments, by incorporating or integrating a role based authentication or security tag, header or flag into user data transactions or message, a distributed access control scheme (e.g., ACLs, etc.) may be employed by a network. In various embodiments, this may allow servers or other network devices (e.g., switches or routers) to maintain their own ACLs or equivalent access schemes. In some embodiments, this may allow a tiered access scheme; although, it is understood that the above are merely a few illustrative examples to which the disclosed subject matter is not limited.

In various embodiments, the role based authentication or security tag may be included as part of a MACsec SecTag, as described above. In another embodiment, such a role based authentication or security tag may be included as part of a virtual local access network (VLAN) header or tag, as described below.

FIG. 4 is a block diagram of example embodiments of data packets 401 and 403 in accordance with the disclosed subject matter. In various embodiments, the data packet 401 may include a destination address 402, a source address 404, a payload portion 408, and a MACsec SecTag 406. In various embodiments, the data packet 403 may include a destination address 402, a source address 404, a payload portion 408, and a VLAN header or tag 492. It is understood that while the term "packet" is used in this embodiment, other embodiments may include other forms or data formatting (e.g., frames, etc.).

In various embodiments, the destination address 402 may include the network address of the substantially final network device (e.g., server, client, etc.) for whom the packet 401 or at least the payload portion 408 is destined. Conversely, the source address 404 may include the network address of the substantially first or originating network device (e.g., server, client, etc.) from whom the packet 401 or at least the payload portion 408 was originally sent. In various embodiments, the source address 404 and destination address 402 may represent intermediate network devices along the path from the ultimate source and destination.

In various embodiments, the payload portion 408 may include the data that the source network device (e.g., client, server, etc.) seeks to communicate with the destination source network device. It is also understood that, in various embodiments, the payload portion 408 may include an encapsulated payload portion and that ultimately it may be this encapsulated payload portion (in an un-encapsulated format) that is transmitted to the destination. In various embodiments, the payload portion 408 may include one or more nested headers or footers and ultimately the data payload, as is often done in many network protocols. Herein, the term "payload portion" includes that un-encapsulated data that is ultimately communicated (or attempted to be communicated) to the destination network device.

In some embodiments, the data packet 401 and/or data packet 403 may include error correction data or information. In various embodiments, this may include an Integrity Check Value (ICV) 410 and/or a frame check sequence (FCS) 412. In one embodiment, the ICV portion 410 and/or FCS portion 412 may include checksums to facilitate the correct and error-free transmission of the data or payload portion 408 or sub-portion of the data packet across the network.

In various embodiments, the ICV portion 410 may be employed to authenticate the integrity of the destination MAC address 402 and source MAC address 404 parameters, as well as all the fields of the MACsec Protocol Data Unit (MPDU). In various embodiments, the MPDU may include the MACsec SecTag 406, Payload 408 and ICV 410 itself. In some embodiments, the ICV portion 410 may be required by the I.E.E.E. 802.1 AE standard and included in any security tag that is substantially compatible with the I.E.E.E. 802.1 AE standard. In various embodiments, in which the MACsec SecTag 406 includes a role based security tag, as described below, the ICV portion 410 may provide integrity protection of the role based security tag.

In one embodiment, the ICV portion 410 may include a value that is derived by performing an algorithmic transformation on the data unit, payload portion, other portions for which data integrity services are provided. The ICV portion 410 may be, in one embodiment, sent with the protected payload portion 408 or MPDU and may be recalculated and compared by the receiver to detect data modification. Although, it is understood that the above are merely a few illustrative examples to which the disclosed subject matter is not limited.

In one embodiment, the data packet 401 may include a MACsec SecTag 406. As described above, in various embodiments, the MACsec SecTag 406 may include a protocol header, comprising a number of octets and beginning with an EtherType portion 422, that is prepended to the payload portion 408 supplied by the client of the protocol, and is used to provide security guarantees. In such an embodiment, the MACsec SecTag 406 may include an implementation or embodiment of the MACsec 892.1 AE standard that provides link layer security for an Ethernet network. The 892.1 AE standard may specify the protocol to establish and identify a security association for the data packet 401. In various embodiments, the MACsec Tag 406 may further define or indicate the algorithm and format employed to protect the confidentiality and integrity of the data packet 401 on a point-to-point or shared media based network. As described above, MACsec security association is typically negotiated on a network link-by-link basis.

In various embodiments, the MACsec SecTag 406 may include a MACsec Ethertype 422 configured to indicate the networking protocol encapsulated by the data packet 401 (e.g. MACsec, etc.). In various embodiments, the MACsec Ethertype 422 may include the first two octets of the MACsec SecTag 406.

In some embodiments, the MACsec SecTag 406 may include a TAG Control Information (TCI) portion 424 configured to control information detailing the structure and format of the MACsec SecTag 406. In various embodiments, the TCI portion 424 may include one or more of: the version number of the MACsec protocol, a indication of the use (or lack thereof) of the optional the MAC Source Address parameter to convey the Secure Channel Identifier (SCI) portion 432, a indication of the use (or lack thereof) of the optional explicitly encoded SCI, a indication of the use (or lack thereof) of other optional features, an indication of whether confidentiality or integrity alone are in use, etc.; although, it is understood that the above are merely a few illustrative examples to which the disclosed subject matter is not limited. In various embodiments, the TCI portion 424 may include a sub-portion of the third octet (e.g., bits 8 through 3).

In some embodiments, the MACsec SecTag 406 may include an Association Number (AN) portion 426. In some embodiments, the AN portion 426 may include a number that may be concatenated with the Secure Channel Identifier (SCI) portion 432 to identify a Secure Association (SA). In various embodiments, a SA may include or identify a security relationship that provides security guarantees for packets or frames transmitted from one network device to the other network devices within the security relationship or association. In one embodiment, the AN portion 426 may identify up to four different SAs within the context of a secure channel (SC). In one embodiment, the AN portion 426 may be encoded as an integer the third octet of the MACsec SecTag 406 (e.g., bits 1 and 2).

In some embodiments, the MACsec SecTag 406 may include a Short Length (SL) portion 428 that is configured to indicate the length of the payload portion 408. In various embodiments, the SL portion 428 may include an integer value indicating the length in terms of octets. In some embodiments, the SL portion 428 may be included as at least part of the fourth octet of the MACsec SecTag 406. Bits 7 and 8 of octet 4 shall be zero.

In some embodiments, the MACsec SecTag 406 may include a packet number (PN) portion 430 that is configured to uniquely identify a MACsec frame or packet in the sequence of frames or packets transmitted employing an SA. In various embodiments, the PN portion 430 may be included as part octets five through eight of the MACsec SecTag 406.

In various embodiments, the MACsec SecTag 406 may include a Secure Channel Identifier (SCI) portion 432 that is configured to provide a globally unique identifier for a secure channel. In some embodiments, the SCI portion 432 may include substantially globally unique MAC Address and a Port Identifier, wherein "unique" means unique within the system allocated that address. In various embodiments, the SCI portion 432 may be included as part of octets eight through sixteen of the MACsec SecTag 406. In some embodiments, a first portion 434 of the SCI 432 (e.g., six octets) may include a substantially globally unique MAC address associated with the transmitting network device. In one embodiment, a second portion 436 of the SCI 432 (e.g., 2 octets) may be used or employed to encode the Port Identifier component of the SCI 432, as an integer.

In various embodiments, a portion 440 of the SCI 432 may be employed or used to encode the role tag or a numeric identifier that substantially uniquely identifies the role or roles assigned to or associated with the source network device. In various embodiments, this role tag portion 440 may be included as part or all of the port identifier portion 436 of the SCI 423. In such an embodiment, the role tag 440 may be protected using MACsec-based link layer authentication, as described above.

In various embodiments, the role tag may comprise 12 bits. In various embodiments, the PI 436 may include 16 bits of which 12 may be employed for the role tag 440. Although, it is understood that the above is merely one illustrative example to which the disclosed subject matter is not limited.

In one embodiment, communication amongst network devices may occur on network ports that are mapped to roles. For example, if a role tag value is "136", communication from network devices assigned that role tag may occur via network port "136"; although, it is understood that the above is merely one illustrative example to which the disclosed subject matter is not limited. In another embodiment, the role tag 440 may supplant the purpose of the PI portion 436. In various embodiments, the TCI 424 may be employed to indicate such a re-purposing of all or a portion of the SCI 432. In another embodiment, a portion of the SCI 432 itself may be employed to indicate the existence of the role tag portion 440.

In various embodiments, the role tag 440 may be assigned through authentication (e.g., via the 892.1 AE protocol) to identify the role of the supplicant (e.g., user, client, etc.) accessing the network. In some embodiments, roles may be created and stored in backend authentication server/directory server (e.g., authentication server 110 or database 112 of FIG. 1 or 2). In such an embodiment, the role tag 440 may be associated with user generated traffic, as described above. Although, it is understood that the above are merely a few illustrative examples to which the disclosed subject matter is not limited.

In various embodiments, a virtual local area network (VLAN) header or tag may be employed to carry or indicate a role based authentication tag (e.g., role tag 440). In such an embodiment, a network device may not support or desire the use of the 892.1 AE standard. Although, it is understood that the above is merely one illustrative example to which the disclosed subject matter is not limited.

In various embodiments, the VLAN data packet 403 may include a MAC destination address portion 402, a MAC source address portion 404, a payload portion 408, and a VLAN header or tag 492. In various embodiments, the VLAN data packet 403 may also include some form of data integrity or error detection (e.g., FCS portion 412, etc.).

In one embodiment, the VLAN header or tag 492 may include, for purposes of this matter, two portions. In various embodiments, the VLAN header or tag 492 may include a VLAN identifier (ID) portion 496 and a second portion 494.

The VLAN ID 496 may generally be configured to indicate the VLAN of which the data packet 403 is a part. However, in various embodiments, the VLAN ID 496 may be repurposed to include the role tag 440 or an indication thereof. In such an embodiment, the role tag value and VLAN ID value may be synonymous, similarly to the embodiment discussed above in which the network port ID and the role tag value where synonymous. In another embodiment, the VLAN ID portion 496 may simply be employed as a mule or carrier for the role tag 440. It is understood that the above are merely a few illustrative examples to which the disclosed subject matter is not limited.

In some embodiments, the VLAN ID portion 496 may include 12 bits. In one embodiment, the role tag 440 may be no larger than 12 bits allowing it to comfortably fit within either the VLAN ID portion 496 or the PI portion 436, as described above. In another embodiment, the role tag 440 may be larger but map-able to a value that fits within the VLAN ID portion 496.

In various embodiments, the second portion 494 may be configured to include various other header information aside from the VLAN ID 496. The exact details of the other header information portion 494 are generally not germane to the current matter. However, in various embodiments, the other header information portion 494 may include a flag or version number, for example, that indicates the repurposing of the VLAN ID portion 496 or, in another embodiment, the existence of the role tag 440.

FIG. 3 is a block diagram of an example embodiment of a system 300 in accordance with the disclosed subject matter. FIG. 3 illustrates four embodiments of data transmission that may occur through or via the system 300; although, it is understood that the above are merely a few illustrative examples to which the disclosed subject matter is not limited.

In one embodiment, the system 300 may include a client or source network device 303, two routing network devices (e.g., network device A 306 and network device B 306b), and a server or destination network device 314. In various embodiments, the routing network devices may include at least one ingress port (e.g., ingress ports 308 and 308b), at least one egress port (e.g., egress ports 312 and 312b), and a switching fabric (e.g., switching fabric 310 and 310b) configured to route data from the receiving ingress to the proper egress port for the data to continue its journey to the destination network device 314. In the illustrated embodiment, the ingress and egress ports may include a physical network layer (PHY) device or component configured to encode or decode the data as it is received or transmitted. It is understood that this is merely a simplified illustrative embodiment to which the disclosed subject matter is not limited.

In the illustrated embodiment, the data packet or frame may traverse a number of "hops" or portions of the network where the data packet (or at least the payload portion thereof) is transferred from one device or component to another. In various embodiments, a "hop" may include a network link from one network device to another (e.g., hops 351, 354, and 357). In other embodiments, a "hop" may include a transfer from one component within a network device to another component within the same network device (e.g., hops 352, 353, 355, 356, and 358); where it is understood that a number modern routing network devices may be aggregated into acting as a single larger routing network device.

Table 399 of FIG. 3 illustrates four different embodiments of data transmission that may occur through or via the system 300; although, it is understood that the above are merely a few illustrative examples to which the disclosed subject matter is not limited. Specifically, Table 399 illustrates how, in these four illustrative embodiments, portions of the data packet or frame may be inspected, removed, generated, or added by the transmitting device or component of each "hop".

In the first embodiment (e.g. Embodiment #1), all four of the network devices 304, 306, 306b, and 314 of system 300 may support the MACsec protocol and the use or employment of the MACsec protocol to convey role based authentication via a role tag, as described above. The first embodiment also illustrates the link-to-link nature of the MACsec protocol and the removal and preservation of the role based authentication tag within a routing network device (e.g., network device A 306, etc.) via the VLAN header.

In such an embodiment, the client 304 may be authenticated via, for example, I.E.E.E. 802.1X standards and assigned a role before communication starts. In various embodiments, if the client 304 is MACsec-enabled, the role information or identifier may become a role tag associated with user traffic. In some embodiments, the role tag may be embedded or included as part of the SCI in SecTAQ as described above.

In such an embodiment, the client 304 may transmit, via hop 351, a data packet that includes a MAC destination address (DA) portion, a MAC source (SA) portion, a MACsec SecTag (ST) portion, a payload (P) portion, and an ICV portion, as described above. In various embodiments, the data packet or frame may be received by an ingress port 308.

In various embodiments, the network device 306, or the ingress port 308, may be configured to determine if the received data packet includes a security tag that includes a role based authentication tag. If so, in one embodiment, the ingress port 308 or the PHY of the ingress port 308 may generate a VLAN header or tag (VT) that includes the role tag information originally included in the MACsec tag (ST), as described above. In some embodiments, the ST and ICV portions may be removed from the data packet, as dictated by the 892.1 AE standard.

In some embodiments, the ingress port 308 may transmit, via hop 352, a data packet that includes a MAC destination address (DA) portion, a MAC source (SA) portion, a VLAN portion that includes a role tag (VT), and a payload (P) portion, as described above. This internal or VLAN-based data packet may be received and transmitted by the switching fabric 310 to the egress port 312.

In one embodiment, the egress port 312 or the PHY thereof, may determine if the received data packet includes a VLAN tag that includes a role based authentication tag. If so, in one embodiment, the egress port 312 or the PHY thereof may generate a MACsec tag (ST) that includes the role tag information previously included in the VLAN header or tag (VT), as described above. In various embodiments, the egress port 312 may also generate an ICV portion as dictated by the 892.1 AE standard. In such an embodiment, the egress port 312 may transmit, via hop 354, a data packet that includes a MAC destination address (DA) portion, a MAC source (SA) portion, a MACsec SecTag (ST) portion, a payload (P) portion, and an ICV portion, as described above.

In various embodiments, this process may continue through network device B 306b and any intervening network devices (not shown) until the data is received by the server 314. The network devices (e.g., network device B 306b, etc.) may propagate the role tag from ingress port (e.g., ingress port 308b) to egress port (e.g., egress port 312b). On each link segment (e.g., "hops" 354, 357, etc.), the role tag may be protected as part of the MACsec frame, as described above.

In one embodiment, the server 314 or the PHY thereof may provide the server 314 with the role tag encoded within the MACsec SecTag (ST) and remove the MACsec SecTag (ST) and accompanying ICV portion. In various embodiments, the server 314 may include or be configured to utilize an ACL based upon role tags. In such an embodiment, the role tag embedded in the SCI may be parsed as the key to lookup ACL database for policy control.

In the second embodiment (e.g. Embodiment #2), three of the four the network devices 306, 306b, and 314 of system 300 may support the MACsec protocol and the use or employment of the MACsec protocol to convey role based authentication via a role tag, as described above. In the illustrated embodiment, the client 304 may not be configured to support role based authentication via a role tag.

In such an embodiment, the client 304 may be authenticated via I.E.E.E. 802.1X or 802.1 AF standards and assigned a role before communication starts. However, in various embodiments, the client 304 may not be configured to support or accept the assigned role based authentication. In such an embodiment, the client 304 may not be configured to transmit the assigned role via the data packet.

In such an embodiment, the client 304 may transmit, via hop 351, a data packet that includes a MAC destination address (DA) portion, a MAC source (SA) portion, and a payload (P) portion, as described above. In various embodiments, the data packet or frame may be received by an ingress port 308.

In various embodiments, the network device 306, or the ingress port 308, may be configured to determine if the received data packet includes a security tag that includes a role based authentication tag. If not, in one embodiment, the ingress port 308 or the PHY of the ingress port 308 may forward the data packet to the switching fabric 310 without modification (in regards to the role based authentication information).

In one embodiment, the network device A 306 or switching fabric 310 may be configured to assign a default role to data entering via the ingress port 308 or exiting via the egress port 312. In some embodiments, if the client 304 is not enabled or configured to accept the assigned role-based authentication, the role information or identifier may be transmitted to an access point (AP) (e.g., network device A 306). In such an embodiment, data packets originating (e.g., having a source address of, etc.) the client 304 may be encoded with the role-base authentication tag by the AP acting as a proxy for the client 304.

In various embodiments, the switching fabric 310 may generate a VLAN header or tag (VT) that includes the role tag information assigned by default or by proxy, as described above. In some embodiments, the egress sport 312 In some embodiments, the ST and ICV portions may be removed from the data packet, as dictated by the 892.1 AE standard.

In one embodiment, the egress port 312 or the PHY thereof, may determine if the received data packet via hop 353 includes a VLAN tag that includes a role based authentication tag. If so, in one embodiment, the egress port 312 or the PHY thereof may generate a MACsec tag (ST) that includes the role tag information previously included in the VLAN header or tag (VT), as described above. In various embodiments, the egress port 312 may also generate an ICV portion as dictated by the 892.1 AE standard. In such an embodiment, the egress port 312 may transmit, via hop 354, a data packet that includes a MAC destination address (DA) portion, a MAC source (SA) portion, a MACsec SecTag (ST) portion, a payload (P) portion, and an ICV portion, as described above.

In various embodiments, the process as described in relation to Embodiment #1 may continue through network device B 306b and any intervening network devices (not shown) until the data is received by the server 314. In one embodiment, the server 314 or the PHY thereof may provide the server 314 with the role tag encoded within the MACsec SecTag (ST) and remove the MACsec SecTag (ST) and accompanying ICV portion.

In the third embodiment (e.g. Embodiment #3), only the final two of the four the network devices 306b and 314 of system 300 may support the MACsec protocol and the use or employment of the MACsec protocol to convey role based authentication via a role tag, as described above. In the illustrated embodiment, the client 304 and network device A 306 may not be configured to support role based authentication via a role tag. Furthermore, the third embodiment illustrates the possibility that other headers or tags (e.g., a VLAN forwarding tag) may be added to the data packet as it traverses the network.

Again, in such an embodiment, the client 304 may be authenticated and transmit, via hop 351, a data packet that includes a MAC destination address (DA) portion, a MAC source (SA) portion, and a payload (P) portion, as described above. In various embodiments, the data packet or frame may be received by an ingress port 308.

In one embodiment, the network device A 306 may add or attach an additional header to the data packet. In one embodiment, a traditional VLAN header without any role-based authentication tag (VF) may be attached or added to the data packet for forwarding purposes. Although, it is understood that the above is merely one illustrative example to which the disclosed subject matter is not limited.

In such an embodiment, the egress port 312 may transmit, via hop 354, a data packet that includes a MAC destination address (DA) portion, a MAC source (SA) portion, a forwarding VLAN header (VF), and a payload (P) portion, as described above. In various embodiments, the data packet or frame may be received by an ingress port 308b.

In such an embodiment, the network device B 306b may add or assign a default authentication role to the data packet (e.g., "low-level user", "guest", etc.) and forward the packet along, as described above. Eventually, in the illustrated embodiment, the data packet may be received by the server 314, where the default role or role assigned by the network device B 306b may be extracted.

In the fourth embodiment (e.g. Embodiment #4), again three of the four the network devices 306a, 306b, and 314 of system 300 may support the MACsec protocol and the use or employment of the MACsec protocol to convey role based authentication via a role tag, as described above. In the illustrated embodiment, the client 304 may not be configured to support role based authentication via a role tag. Furthermore, the fourth embodiment illustrates the possibility that other headers or tags (e.g., a VLAN forwarding tag) may be added to the data packet as it traverses the network.

Again, in such an embodiment, the client 304 may be authenticated and transmit, via hop 351, a data packet that includes a MAC destination address (DA) portion, a MAC source (SA) portion, and a payload (P) portion, as described above. In various embodiments, the data packet or frame may be received by an ingress port 308.

In such an embodiment, a role may be assigned by the network device A 306, as described above in relation to the second embodiment. In such an embodiment, this may result in a MACsec SecTag (ST) that includes a role based authentication tag, as described above. As described above, the data packet or at least the payload (P) portion thereof, may be transmitted to the server 315, as described above.

FIG. 5 is a flow chart of an example embodiment of a technique in accordance with the disclosed subject matter. In various embodiments, the technique 500 may be used or produced by the systems such as those of FIG. 1, 2, or 3. Furthermore, portions of technique 500 may be used or produced by a data packet such as those of FIG. 4. Although, it is understood that the above are merely a few illustrative examples to which the disclosed subject matter is not limited. Furthermore, it is understood that the disclosed subject matter is not limited to the ordering of or number of actions illustrated by technique 500.

Block 502 illustrates that, in one embodiment, a data packet may be received that includes a payload portion, a source network address and a destination network address, as described above. In various embodiments, one or more of the action(s) illustrated by this Block may be performed by or related to the network devices 106, 108, 108a, 114, 114a, or 114b of FIG. 1 or 2, the network devices 306, 306b, and 314 or ingress ports 308 or 308b of FIG. 3, or packets 401 or 403 of FIG. 4, as described above.

Block 504 illustrates that, in one embodiment, a determination may be made as to whether or not the data packet includes a security tag that includes a role based authentication tag, as described above. In some embodiments, determining may include determining if the data packet includes a security tag that is substantially compatible with the I.E.E.E. 802.1 AE standard, as described above. In various embodiments, determining may include determining if the role based authentication tag is included as a portion of a Secure Channel Identifier, as described above. In yet another embodiment, determining may include determining if the security tag includes a VLAN header or tag that includes a role based authentication tag (e.g., a VLAN SecTag or Vsectag, etc.), as described above.

In some embodiments, a configuration bit may be set to configure the network device to determine the role tag by masking certain bits (e.g., the lower 12 bits) of the SCI when performing a comparison to the SCI in a SC entry table. In another embodiment, another or the same configuration bit may be set to configure the network device to determine the role tag by employing the VID of a VLAN header as the role tag.

In various embodiments, one or more of the action(s) illustrated by this Block may be performed by or related to the network devices 106, 108, 108*a*, 114, 114*a*, or 114*b* of FIG. 1 or 2, the network devices 306, 306*b*, and 314 or ingress ports 308 or 308*b* of FIG. 3, or packets 401 or 403 of FIG. 4, as described above.

Block 506 illustrates that, in one embodiment, if the data packet includes a security tag that includes a role based authentication tag, a virtual local area network (VLAN) tag may be generated that includes the role based authentication tag, as described above. In one embodiment, generating may include placing the role based authentication tag within a VLAD identifier (ID) portion of the VLAN tag, as described above. In some embodiments, another or the same configuration bit may be set to configure the network device to write the predetermined bits (e.g., the lower 12 bits) of the SCI as the VLAN ID portion of the VLAN header or tag, as described above. In various embodiments, one or more of the action(s) illustrated by this Block may be performed by or related to the network devices 106, 108, 108*a*, 114, 114*a*, or 114*b* of FIG. 1 or 2, the network devices 306, 306*b*, and 314 or ingress ports 308 or 308*b* of FIG. 3, or packet 403 of FIG. 4, as described above.

Block 508 illustrates that, in one embodiment, the security tag may be disassociated or removed from the payload portion of the data packet, as described above. In various embodiments, one or more of the action(s) illustrated by this Block may be performed by or related to the network devices 106, 108, 108*a*, 114, 114*a*, or 114*b* of FIG. 1 or 2, the network devices 306, 306*b*, and 314 or ingress ports 308 or 308*b* of FIG. 3, or packets 401 or 403 of FIG. 4, as described above.

Block 510 illustrates that, in one embodiment, the VLAN header or tag may be associated, coupled with or added with the payload portion of the data packet, as described above. In various embodiments, one or more of the action(s) illustrated by this Block may be performed by or related to the network devices 106, 108, 108*a*, 114, 114*a*, or 114*b* of FIG. 1 or 2, the network devices 306, 306*b*, and 314 or ingress ports 308 or 308*b* of FIG. 3, or packets 401 or 403 of FIG. 4, as described above.

Conversely, Block 512 illustrates that, in one embodiment, if the data packet does not include a security tag that includes a role based authentication tag, a predetermined role value may be assigned to the data packet, as described above. As described above, in various embodiments, the predetermined role value may include a default role value. In another embodiment, the predetermined role value may include a role value assigned or associated with the source network device by an authentication server or entity, as described above. In various embodiments, one or more of the action(s) illustrated by this Block may be performed by or related to the network devices 106, 108, 108*a*, 114, 114*a*, or 114*b* of FIG. 1 or 2, the network devices 306, 306*b*, and 314 or ingress ports 308 or 308*b* of FIG. 3, or packets 401 or 403 of FIG. 4, as described above.

Block 514 illustrates that, in one embodiment, a role based authentication tag may be generated that includes the predetermined role value, as described above. In various embodiments, generating the role based authentication tag may include generating a MACsec SecTag, as described above. In another embodiment, generating may include generating a VLAN header or tag, as described above. In various embodiments, one or more of the action(s) illustrated by this Block may be performed by or related to the network devices 106, 108, 108*a*, 114, 114*a*, or 114*b* of FIG. 1 or 2, the network devices 306, 306*b*, and 314 or ingress ports 308 or 308*b* of FIG. 3, or packets 401 or 403 of FIG. 4, as described above.

Block 516 illustrates that, in one embodiment, the role based authentication tag may be associated or coupled with the payload portion of the data packet, as described above. In various embodiments, one or more of the action(s) illustrated by this Block may be performed by or related to the network devices 106, 108, 108*a*, 114, 114*a*, or 114*b* of FIG. 1 or 2, the network devices 306, 306*b*, and 314 or ingress ports 308 or 308*b* of FIG. 3, or packets 401 or 403 of FIG. 4, as described above.

Block 518 illustrates that, in one embodiment, a network route or privileges may be determined based at least in part upon the role based authentication tag, as described above. In various embodiments, if the role based authentication tag does not indicate that the data packet or the sender thereof does not have sufficient privileges to access the destination address, the data packet may be dropped, discarded or otherwise made to not reach its intended destination. In another embodiment, one of a plurality of routes may be selected based upon the role based authentication tag. In various embodiments, one or more of the action(s) illustrated by this Block may be performed by or related to the network devices 106, 108, 108*a*, 114, 114*a*, or 114*b* of FIG. 1 or 2, the network devices 306, 306*b*, and 314 or egress ports 312 or 312*b* of FIG. 3, or packets 401 or 403 of FIG. 4, as described above.

Block 520 illustrates that, in one embodiment, a determination may be made as to whether or not a next network device (along the network path to the destination address) is configured to support a data packet that includes a security tag that includes a role based authentication tag, as described above. In various embodiments, if the next network device does support the security tag, a security tag that includes the role based authentication tag may be generated and associated with the payload portion of the data packet, as described above. Conversely, if the next network device does not support the security tag, a VLAN header or tag that includes the role based authentication tag may be generated and associated with the payload portion of the data packet, as described above. In another embodiment, one of a plurality of routes may be selected based upon the role based authentication tag. In various embodiments, one or more of the action(s) illustrated by this Block may be performed by or related to the network devices 106, 108, 108*a*, 114, 114*a*, or 114*b* of FIG. 1 or 2, the network devices 306, 306*b*, and 314 or egress ports 312 or 312*b* of FIG. 3, or packets 401 or 403 of FIG. 4, as described above.

Block 522 illustrates that, in one embodiment, at least the payload portion and the role based authentication tag may be transmitted towards the destination network address, as described above. In one embodiment, transmitting may include the actions of Block 520, as described above. In various embodiments, one or more of the action(s) illustrated by this Block may be performed by or related to the network devices 106, 108, 108*a*, 114, 114*a*, or 114*b* of FIG. 1 or 2, the network devices 306, 306*b*, and 314 or egress ports 312 or 312*b* of FIG. 3, or packets 401 or 403 of FIG. 4, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g. in a machine-readable storage device or in a propagated signal, for execution by, or to control the operation of, data processing apparatus, e.g. a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g. an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g. internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g. a cathode ray tube (CRT) or liquid crystal display (LCD) monitor, for displaying information to the user and a keyboard and a pointing device, e.g. a mouse or a trackball, by which the user can provide input to the computer. Other kinds of devices can be used to provide for interaction with a user as well; for example, feedback provided to the user can be any form of sensory feedback, e.g. visual feedback, auditory feedback, or tactile feedback; and input from the user can be received in any form, including acoustic, speech, or tactile input.

Implementations may be implemented in a computing system that includes a back-end component, e.g. as a data server, or that includes a middleware component, e.g. an application server, or that includes a front-end component, e.g. a client computer having a graphical user interface or a Web browser through which a user can interact with an implementation, or any combination of such back-end, middleware, or front-end components. Components may be interconnected by any form or medium of digital data communication, e.g. a communication network. Examples of communication networks include a local area network (LAN) and a wide area network (WAN), e.g. the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
   receiving, via an ingress port of a network device, a data packet that includes a payload portion and a destination network address;
   determining if the data packet, as received, includes a security tag, in a first protocol format, that includes a role based authentication tag; and
   if the data packet, as received, includes a security tag that includes a role based authentication tag;
      determining whether or not a next network device, in a network path towards the destination network address, is configured to support a data packet that includes a security tag in the first protocol format,
      if so, generating, in the first protocol format, a first protocol-formatted security tag that includes the role based authentication tag and associating the first protocol-formatted security tag with the payload portion of the data packet
      if not, generating, in a second protocol format, a second protocol-formatted security tag that includes the role based authentication tag and associating the second protocol-formatted security tag with the payload portion of the data packet, and
      transmitting, via an egress port of the network device and without a determination of privileges associated with the role base authentication tag, at least the payload portion and the role based authentication tag towards, in a topological sense, the destination network address.

2. The method of claim 1, further comprising, if the data packet does not include a security tag that includes a role based authentication tag:
   assigning a predetermined default role value to the data packet;
   generating a role based authentication tag that includes the predetermined default role value;
   associating the role based authentication tag with the payload portion of the data packet; and
   transmitting, via the egress port, at least the payload portion and the role based authentication tag towards, in a topological sense, the destination network address.

3. The method of claim 1,
   wherein generating the first protocol-formatted security tag includes generating a security tag that is substantially compliant with the MACsec protocol.

4. The method of claim 1, wherein generating the second protocol-formatted security tag includes:
   generating a virtual local area network (VLAN) tag that includes the role based authentication tag.

5. The method of claim 1, further comprising, if the data packet includes a security tag that includes a role based authentication tag:
   disassociating the security tag from the payload portion; and
   associating either the first protocol-formatted security tag or the second protocol-formatted security tag with the payload portion.

6. The method of claim 1, further comprising, if the data packet includes a security tag that includes a role based authentication tag: determining a network route based at least in part upon the role based authentication tag.

7. The method of claim 4, wherein
   generating a virtual local area network (VLAN) tag that includes the role based authentication tag includes placing the role based authentication tag within a VLAN identifier (ID) portion of the VLAN tag.

8. The method of claim 1, wherein determining if the data packet includes a security tag comprises: determining if the data packet includes a security tag that is substantially compatible with the I.E.E.E. 802.1 AE standard.

9. The method of claim 1, wherein determining if the data packet includes a security tag that includes a role based authentication tag comprises: determining if the role based authentication tag is included as a portion of a Secure Channel Identifier.

10. An apparatus comprising:
an ingress port configured to:
receive a data packet that includes a payload portion and a destination network address;
a processor configured to:
determine if the data packet includes a security tag, in a first protocol format, that includes a role based authentication tag, and
determining whether or not a next network device, in a network path towards the destination network address, is configured to support a data packet that includes a security tag in the first protocol format,
if so, generating, in the first protocol format, a first protocol-formatted security tag that includes the role based authentication tag and associating the first protocol-formatted security tag with the payload portion of the data packet
if not, generating, in a second protocol format, a second protocol-formatted security tag that includes the role based authentication tag and associating the second protocol-formatted security tag with the payload portion of the data packet; and
an egress port configured to:
if the data packet includes a security tag that includes a role based authentication tag, transmit, without a determination of privileges associated with the role base authentication tag, at least the payload portion and the role based authentication tag towards, in a topological sense, the destination network address.

11. The apparatus of claim 10, wherein the processor is configured to, if the data packet does not include a security tag that includes a role based authentication tag:
assign a predetermined default role value to the data packet,
generate a role based authentication tag that includes the predetermined default role value, and associate the role based authentication tag with the payload portion of the data packet; and
wherein the egress port is configured to: transmit at least the payload portion and the role based authentication tag towards, in a topological sense, the destination network address.

12. The apparatus of claim 10, wherein the apparatus is configured to
generate the first protocol-formatted security tag such that the first protocol-formatted security tag is substantially compliant with the MACsec protocol.

13. The apparatus of claim 10, wherein the apparatus is configured to
generate the second protocol-formatted security tag such that the second protocol-formatted security tag includes a virtual local area network (VLAN) tag that includes the role based authentication tag.

14. The apparatus of claim 10, wherein the apparatus is configured to, if the data packet includes a security tag that includes a role based authentication tag: generate a virtual local area network (VLAN) tag that includes the role based authentication tag; disassociate the security tag from the payload portion; and associate the VLAN tag with the payload portion.

15. The apparatus of claim 10, wherein the processor is configured to: determine a network route based at least in part upon the role based authentication tag.

16. The apparatus of claim 13, wherein the apparatus is configured to, when generating a virtual local area network (VLAN) tag that includes the role based authentication tag, place the role based authentication tag within a VLAN identifier (ID) portion of the VLAN tag.

17. The apparatus of claim 10, wherein the processor is configured to: determine if the data packet includes a security tag that is substantially compatible with the I.E.E.E. 802.1 AE standard.

18. The apparatus of claim 10, wherein the processor is configured to: determine if the role based authentication tag is included as a portion of a Secure Channel Identifier.

19. A computer program product for communicating information, the computer program product being tangibly and non-transitorily embodied on a computer-readable medium and including executable code that, when executed, is configured to cause a network apparatus to:
receive, via an ingress port of the network device, a data packet that includes a payload portion, a source network address and a destination network address;
determine if the data packet includes a security tag, in a first protocol format, that includes a role based authentication tag; and
if the data packet includes a security tag that includes a role based authentication tag:
determine whether or not a next network device, in a network path towards the destination network address, is configured to support a data packet that includes a security tag in the first protocol format,
if so, generate, in the first protocol format, a first protocol-formatted security tag that includes the role based authentication tag and associating the first protocol-formatted security tag with the payload portion of the data packet
if not, generate, in a second protocol format, a second protocol-formatted security tag that includes the role based authentication tag and associating the second protocol-formatted security tag with the payload portion of the data packet, and
transmit, without a determination of privileges associated with the role base authentication tag, at least the payload portion and the role based authentication tag towards, in a topological sense, the destination network address.

20. A computer program product of claim 19, wherein executable code that, when executed, is configured to cause a network apparatus to:
generate the first protocol-formatted security tag such that the first protocol-formatted security tag is substantially compliant with the MACsec protocol, and
generate the second protocol-formatted security tag such that the second protocol-formatted security tag includes a virtual local area network (VLAN) tag that includes the role based authentication tag.

* * * * *